L. Warren. Three Horse Equalizer.

117021          Patented Jul 11 1871

Witnesses:
P. C. Dieterich
Wm. H. E. Smith.

Inventor:
L. Warren.
Per
Attorneys.

// 117,021

UNITED STATES PATENT OFFICE.

LUTHER WARREN, OF DWIGHT, ILLINOIS.

IMPROVEMENT IN THREE-HORSE EQUALIZERS.

Specification forming part of Letters Patent No. 117,021, dated July 11, 1871.

*To all whom it may concern:*

Be it known that I, LUTHER WARREN, of Dwight, in the county of Livingston and State of Illinois, have invented a new and useful Improvement in Three-Horse Equalizer; and I do hereby declare that the following is a full, clear, and exact description thereof, which will enable others skilled in the art to make and use the same, reference being had to the accompanying drawing forming part of this specification.

This invention relates to a new and useful improvement in apparatus for equalizing the draft of three horses abreast, when attached to a plow or other implement or vehicle; and consists in levers and rods in connection with a circular draft-plate, with which levers and rods the evener and whiffletrees are connected, as hereinafter more fully described.

Figure 1:
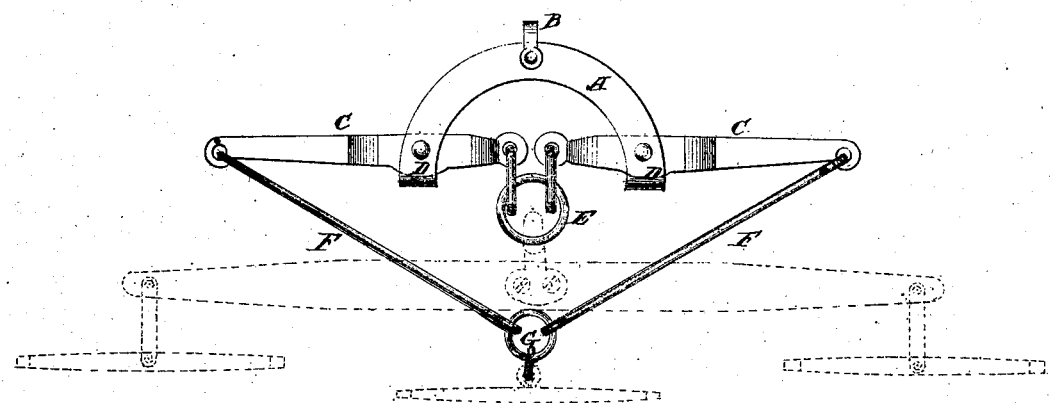
Figure 2:
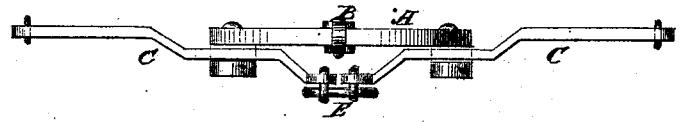

In the accompanying drawing, Figure 1 represents a top or plan view of the whole apparatus, showing the evener and the whiffletrees in dotted lines. Fig. 2 is a back-edge view of the equalizer.

Similar letters of reference indicate corresponding parts.

A is the circular draft-plate, having a clevis, B, attached to the center of its lower edge, by means of which the equalizer is attached to the plow or other implement or vehicle. C C are two levers of equal length and form, having their fulcrums at the points D D, on the ends of the draft-plate. E is a ring, connected with the short ends of these levers by links. A long evener (seen in dotted lines) is attached to this ring, as represented. Whiffletrees are attached to the ends of this evener for the two outside horses. F F are rods connected with the outer ends of the levers C C, which extend inward diagonally, and are attached to the central ring G, as plainly seen in Fig. 1. The whiffletree for the third horse is attached to this ring G, as represented in dotted lines.

It will be seen that by the advantage given the third horse by the levers C C the power of all three horses is equalized. The levers are bent, if required, to bring the whiffletrees on a level with the point of draft. The rods F F pass over the evener, and the evener is designed to be parallel with the levers C C. By this arrangement the objections to the use of three horses abreast for plowing or other farm operations, or for other purposes, are obviated.

Having thus described my invention, I claim as new and desire to secure by Letters Patent—

An equalizer, formed of the plate A, levers C C, and rods F F, with the clevis, links, and rings, or their equivalents, connected therewith, substantially as and for the purposes described.

LUTHER WARREN.

Witnesses:
L. F. SLYDER,
THOMAS FLAHERTY.